United States Patent [19]
Odaka

[11] Patent Number: 5,835,797
[45] Date of Patent: Nov. 10, 1998

[54] OPTICAL APPARATUS WITH VISUAL AXIS DETECTING

[75] Inventor: Yukio Odaka, Kawasaki, Japan

[73] Assignee: Canon Kabushiki Kaisha, Tokyo, Japan

[21] Appl. No.: 760,329

[22] Filed: Dec. 5, 1996

Related U.S. Application Data

[63] Continuation of Ser. No. 364,723, Dec. 27, 1994, abandoned.

[30] Foreign Application Priority Data

Dec. 28, 1993 [JP] Japan .................................. 5-349114

[51] Int. Cl.⁶ .................................................. G03B 13/36
[52] U.S. Cl. ............................... 396/51; 396/95; 396/121
[58] Field of Search ............................... 396/51, 95, 153, 396/121

[56] References Cited

U.S. PATENT DOCUMENTS

| | | | |
|---|---|---|---|
| 4,980,715 | 12/1990 | Utagawa | 396/95 |
| 5,036,347 | 7/1991 | Tsunekawa et al. | 354/400 |
| 5,182,443 | 1/1993 | Suda et al. | 250/201.2 |
| 5,208,625 | 5/1993 | Suekane | 396/95 |
| 5,214,466 | 5/1993 | Nagano et al. | 354/402 |
| 5,225,862 | 7/1993 | Nagano et al. | 354/62 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,296,888 | 3/1994 | Yamada | 354/402 |
| 5,298,927 | 3/1994 | Konishi et al. | 351/211 |
| 5,386,258 | 1/1995 | Nagano | 354/400 |
| 5,434,638 | 7/1995 | Ishibashi et al. | 396/95 |
| 5,502,537 | 3/1996 | Utagawa | 396/95 |
| 5,574,535 | 11/1996 | Ogasawara | 396/95 |
| 5,587,761 | 12/1996 | Kusaka et al. | 396/95 |

FOREIGN PATENT DOCUMENTS

| | | |
|---|---|---|
| 61-61135 | 3/1986 | Japan . |
| 1-241511 | 9/1989 | Japan . |
| 02042430 | 2/1990 | Japan . |

OTHER PUBLICATIONS

Patent Abstracts of Japan, vol. 14, No. 201 (P–1041) Apr. 24, 1990.
Patent Abstracts of Japan, vol. 18, No. 96 (P–1694) Feb. 16, 1994.

*Primary Examiner*—W. B. Perkey
*Attorney, Agent, or Firm*—Fitzpatrick, Cella, Harper & Scinto

[57] ABSTRACT

An optical apparatus with the visual axis detecting function is comprised of an imaging optical system, visual axis detecting means for detecting to which of a plurality of areas in the field of view of the optical system a visual axis is directed, and focusing means responsive to the output of the visual axis detecting means to detect defocus regarding the area to which the visual axis is directed, and adjust the optical system so as to correct the defocus, the focusing means continuously effecting the detection of the defocus and the adjustment of the optical system when the area to which the visual axis is directed after the correction of the defocus is a moving object.

5 Claims, 9 Drawing Sheets

FIG. 9

OPTICAL APPARATUS WITH VISUAL AXIS DETECTING

This application is a Continuation of application Ser. No. 08/364,723 filed Dec. 27, 1994, abandoned.

BACKGROUND OF THE INVENTION

1. Field of the Invention

This invention relates to improvements of an optical apparatus with the visual axis detecting function which enables any of a plurality of focusing point detection areas to be selected by input of a photographer's visual axis.

2. Related Background Art

There have heretofore been proposed various cameras designed such that various kinds of photographing functions such as automatic focus adjustment and automatic exposure are controlled on the basis of a signal from visual axis detecting means for detecting the direction of a photographer's visual axis and detecting what area (position) in a field of a finder the photographer is observing.

For example, Japanese Laid-Open Patent Application No. 61-61135 proposes a camera designed such that an area for causing a focusing point detecting device to function is selected on the basis of an output from visual axis detecting means and a focus state of a photo-taking system is adjusted.

Also, Japanese Laid-Open Patent Application No. 1-241511 proposes a camera which has visual axis detecting means for detecting a direction of a photographer's gaze, focusing point detecting means having a plurality of distance measuring areas and automatic exposure control means having a plurality of photometric sensitivity areas and which is designed such that driving focusing point detecting means and the automatic exposure control means is controlled on the basis of an output signal from the visual axis detecting means.

Focusing point adjusting modes heretofore provided in a camera include a mode for a static object and a mode for a dynamic object.

The mode for a static object is a mode in which lens driving is effected until a photo-taking lens becomes in focus, and once the photo-taking lens becomes in focus, the focusing point operation is not performed thereafter. Also, the mode for a dynamic object is a mode in which even after the photo-taking lens has become in focus, the focusing point detecting operation is continuously performed and lens driving is effected in conformity with the focusing point state.

Also, in latest cameras, there has been proposed a camera which automatically detects the stationariness and "motion" of an object and may be focused on both a static object and a moving object by the same single focusing point adjusting mode (this mode will hereinafter be referred to as automatic switching mode).

This automatic switching mode is such that at first, the camera operates in the mode for a static object and after the photo-taking lens becomes in focus, the camera detects whether the object is a moving object or not, and when the camera discriminates that the object is a moving object, the camera automatically switches to the mode for a dynamic object.

The operations of portions of a camera provided with the visual axis detecting function which are concerned in visual axis detection and focusing point detection will hereinafter be described by focusing point adjusting modes.

1) The mode for a Static Object

When a release button becomes half-depressed at first, the visual axis detecting means operates prior to focusing point detection and finds the photographer's gazing point in the finder field.

This procedure turns on a light source for visual axis detection, effects accumulation in an area sensor for visual axis detection and reads out the photographer's eyeball image signal. It then finds the direction of the photographer's visual axis from this eyeball image signal. Subsequently, it finds from the direction of the visual axis at which portion in the finder field the photographer is gazing, that is, the gazing point. This point is expressed by the coordinates thereof in the finder field.

From these coordinates in the finder field, a focusing point detection area corresponding thereto is determined. For the focusing point detection area found in this manner, the focusing point state is detected by the focusing point detecting means, and on the basis of the information thereof, the photo-taking lens is driven to its in-focus state.

As described above, after the focusing point detection area is once determined by the visual axis detecting means, the focusing operation is performed with attention being paid only to the focusing point state of that focusing point detection area.

2) The Mode for a Dynamic Object

When the release button becomes half-depressed as in the aforedescribed mode for a static object, the visual axis detecting means is operated to thereby determine a focusing point detection area. Thereafter, lens driving is effected with attention being paid only to the focusing point state of that focusing point detection area and focusing point adjustment is continued.

3) The Automatic Switching Mode

This mode is set to only the full auto mode of the camera and is not the setting of a focusing point detection area by the visual axis detecting operation, and has been effected by a method using focusing point detection area automatic selection in which the selection of the focusing point detection area is left to the camera.

When the release button becomes half-depressed at first, the detection of the focusing point state for all focusing point detection areas is effected by the focusing point detecting means.

Subsequently, selection of the focusing point detection areas is effected, but there are several methods for this algorithm, and among them, it is usual to use a method of selecting a focusing point detection area which is capable of detecting the focusing point and is located at the closest side.

Thereafter, on the basis of the focusing point state of this focusing point detection area, the photo-taking lens is driven to its in-focus state. When the photo-taking lens becomes in-focus, the focusing point detecting operation is performed again and whether the object is a moving object or not is discriminated on the basis of the focusing point state of the focusing point detection area in the central portion. When it is discriminated that the object is a moving object, the mode automatically shifts to the above-described mode for a dynamic object.

However, when in the automatic switching mode as described above, whether the object is a moving object is to be discriminated, the discrimination is effected on the basis of the focusing point state of the focusing point detection area in the central portion as previously described. This has led to the problem that when the main object is outside the central portion, discrimination of the moving object cannot be done even if the main object moves, or the mode shifts to the mode for a dynamic object when the photographer does not intend it.

Also, in the automatic switching mode, after the mode has switched to the mode for a dynamic object, if the focal point detection area in the central portion is capable of detecting the focusing point, the in-focus operation is performed on the basis of the focusing point state of this focusing point detection area in the central portion (priority is given to the central portion) and therefore, the object must be held so as to be always located in the central portion, and this has led to a problem that when the object comes off the central portion by mistake, the photo-taking lens is focused on another object rather than the main object.

SUMMARY OF THE INVENTION

The present invention has been made in view of the above-noted problems and the object thereof is to provide an improved optical apparatus with a visual axis detecting function.

A first optical apparatus, according to the present invention, is provided with visual axis detecting means for detecting which of a plurality of areas in the field of view the visual axis is directed, and focusing means responsive to output of the visual axis detecting means to detect defocus regarding the area to which the visual axis is directed and correct the defocus, characterized in that when the area to which the visual axis is directed after the correction of the defocus is a moving object, the focusing means continuously effects the detection and correction of the defocus.

A second optical apparatus, according to the present invention, is provided with an imaging optical system, visual axis detecting means for detecting which of a plurality of areas in the field of view of the optical system the visual axis is directed, and focusing means responsive to output of said visual axis detecting means to detect defocus regarding the area to which the visual axis is directing, and adjust the optical system so as to correct the defocus, characterized in that when the area to which the visual axis is directing after the correction of the defocus is a moving object, said focusing means continuously effects the detection of said defocus and the adjustment of said optical system.

The first and second optical apparatuses of the present invention are applied to a camera or the like.

DESCRIPTION OF THE PREFERRED EMBODIMENTS

The invention will hereinafter be described in detail with respect to some embodiments thereof shown in the drawings.

Figure 1:
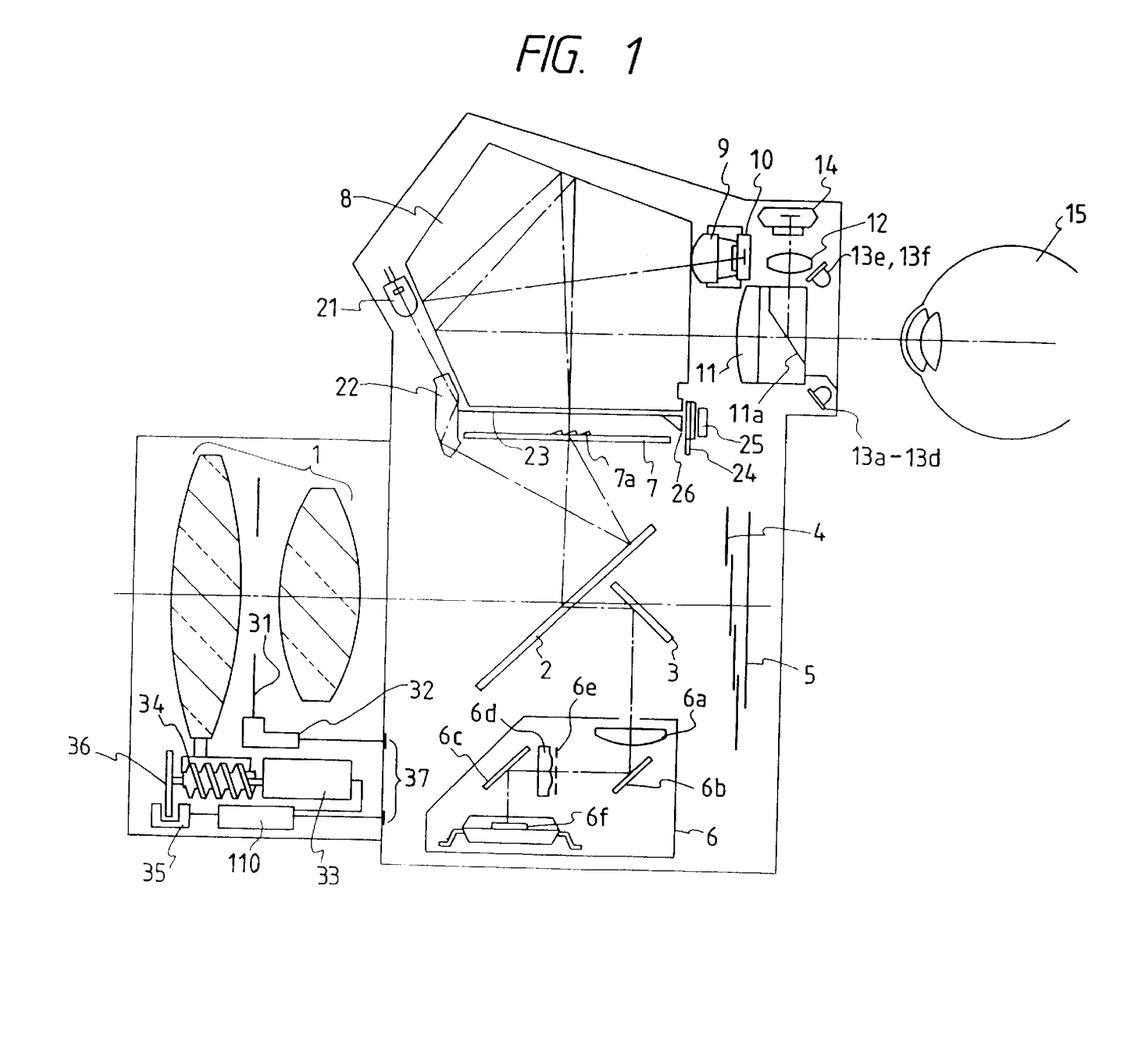
FIG. 1 shows a construction of the essential portions of an embodiment in which the present invention is applied to a single-lens reflex camera.
Figure 2:
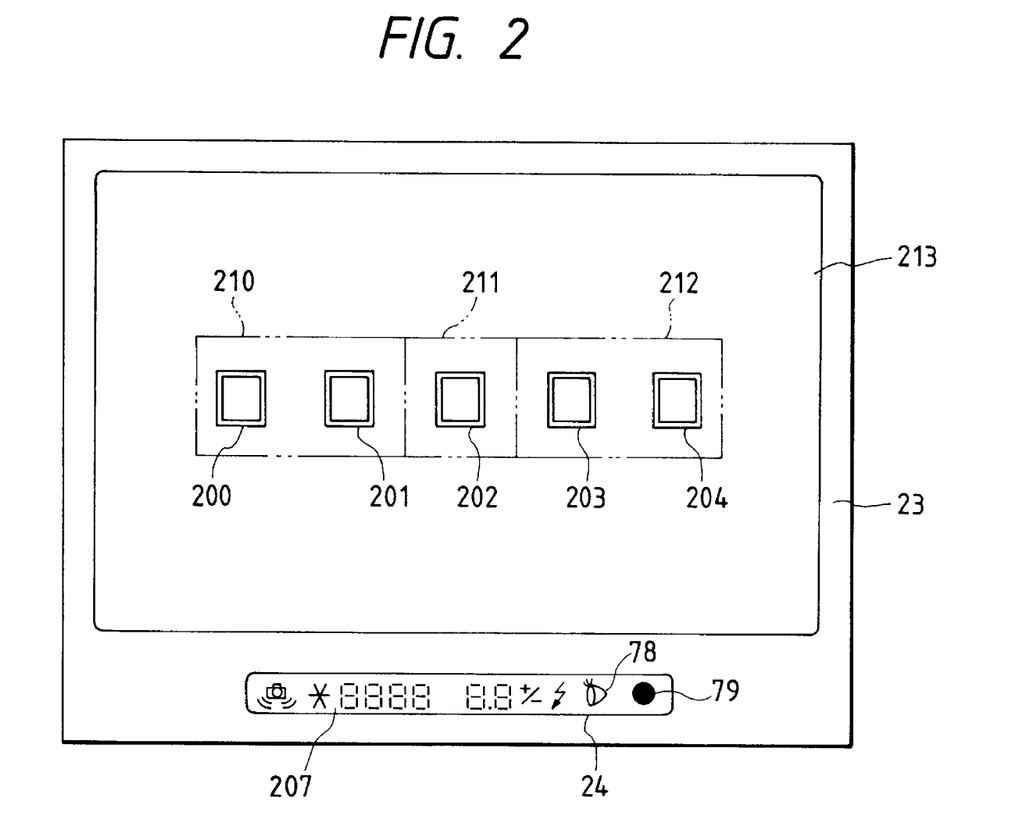
FIG. 2 shows the display in the finder of the camera of FIG. 1.

FIG. 1 is a schematic view of the essential portions of an embodiment in which the present invention is applied to a single-lens reflex camera, and FIG. 2 shows a display in the finder of the camera.

In these figures, the reference numeral 1 designates a photo-taking lens which is shown as two lenses for the sake of convenience, but is actually comprised of more lenses. The reference numeral 2 denotes a main mirror adapted to be inclined toward and retracted from a photo-taking optical path in conformity with the time when an object image is observed by means of the finder and the time when the object image is photographed. The reference numeral 3 designates a sub-mirror for reflecting a beam of light transmitted through the main mirror 2 toward a focus detecting device 6 below the camera body which will be described later.

The reference numeral 4 denotes a shutter, and the reference numeral 5 designates a photosensitive member which is a silver salt film, or a solid state image pickup element such as a CCD or an MOS type element, or an image pickup tube such as a vidicon.

The reference numeral 6 denotes a focus detecting device comprised of a field lens 6a disposed near an imaging plane, reflecting mirrors 6b and 6c, a secondary imaging lens 6d, an aperture 6e, a line sensor group 6f comprising a plurality of CCDS, etc.

The focus detecting device 6 in the present embodiment effects focus detection by the well-known phase difference system, and is designed such that as shown in FIG. 2, with a plurality of areas (five areas) in an observation screen (a finder field) as focus detection areas, focus detection (detection of a defocus amount) becomes possible individually in each focus detection area.

The reference numeral 7 designates a focusing screen disposed in the predetermined imaging plane of the photo-taking lens 1, and the reference numeral 8 denotes a pentaprism for changing a finder's optical path. The reference numerals 9 and 10 designate an imaging lens and a photometry sensor, respectively, for measuring luminance of an object in the observation screen. The imaging lens 9 relates the focusing screen 7 and the photometry sensor 10 conjugately with each other through the reflecting surface of the pentaprism 8.

The reference numeral 11 designates an eyepiece disposed in the rear of the exit surface of the pentaprism 8 and provided with a light divider 11a. The eyepiece 11 is used for observing the focusing screen 7 with a photographer's eye 15. The light divider 11a comprises, for example, a dichroic mirror transmitting visible light therethrough and reflecting infrared light.

The reference numeral 12 denotes a light receiving lens, and the reference numeral 14 designates an image sensor comprising a photoelectric conversion element array such as a CCD disposed two-dimensionally. The image sensor 14 is disposed so as to be conjugate with the vicinity of the pupil of the photographer's eyeball 15 located at a predetermined position with respect to the light receiving lens 12. The reference characters 13a–13f denote infrared light emitting diodes (IREDs) which are light sources.

The reference numeral 21 designates an LED of high luminance for superimposition capable of being visually recognized even in a bright object. Light emitted from this LED is reflected by the main mirror 2 through a light projecting prism 22, and is bent in a perpendicular direction by minute prism arrays 7a provided on the display portion of the focusing screen 7, and passes through the pentaprism 8 and the eyepiece 11 to the photographer's eye 15.

Thus, minute prism arrays 7a are formed into a frame-like shape at a plurality of locations corresponding to the focus detection areas of the focusing screen 7, and these are illuminated by five LEDs 21 for superimposition (LED-L1, LED-L2, LED-C, LED-R1, LED-R2) corresponding thereto.

Thus, marks (hereinafter simply referred to as the focus detection areas) 200, 201, 202, 203 and 204 indicating the respective focus detection areas shine in the field of view of the finder, as can be seen from the field of view of the finder shown in FIG. 2, whereby the focus detection areas can be displayed (this will hereinafter be referred to as the superimpose display).

The reference numeral 23 denotes a field mark forming the field area of the finder, and the reference numeral 24 designates an LCD in finder for displaying photographing information outside the field of view of the finder. The LCD in finder is illuminated by an illuminating LED (F-LED) 25.

The light transmitted through the LCD 24 in finder is directed into the field of view of the finder by a triangular prism 26, and is displayed outside the field of view of the finder as indicated at 207 in FIG. 2, whereby the photographer can grasp the photographing information.

The reference numeral 31 denotes an aperture provided in the photo-taking lens 1, the reference numeral 32 designates an aperture drive device including an aperture drive circuit 111, the reference numeral 33 denotes a lens driving motor, and the reference numeral 34 designates a lens driving member comprising a drive gear, etc. The reference numeral 35 denotes a photocoupler which detects the rotation of a pulse plate 36 operatively associated with the lens driving member 34 and transmits it to a lens focus adjust circuit 110. The focus adjust circuit 110 is designed to drive the lens driving motor 33 by a predetermined amount on the basis of this information and the information of the amount of lens driving from the camera side to thereby move the photo-taking lens 1 to its in-focus position. The reference numeral 37 designates a mount contact which provides the conventional interface between the camera and the lens.

Figure 3:
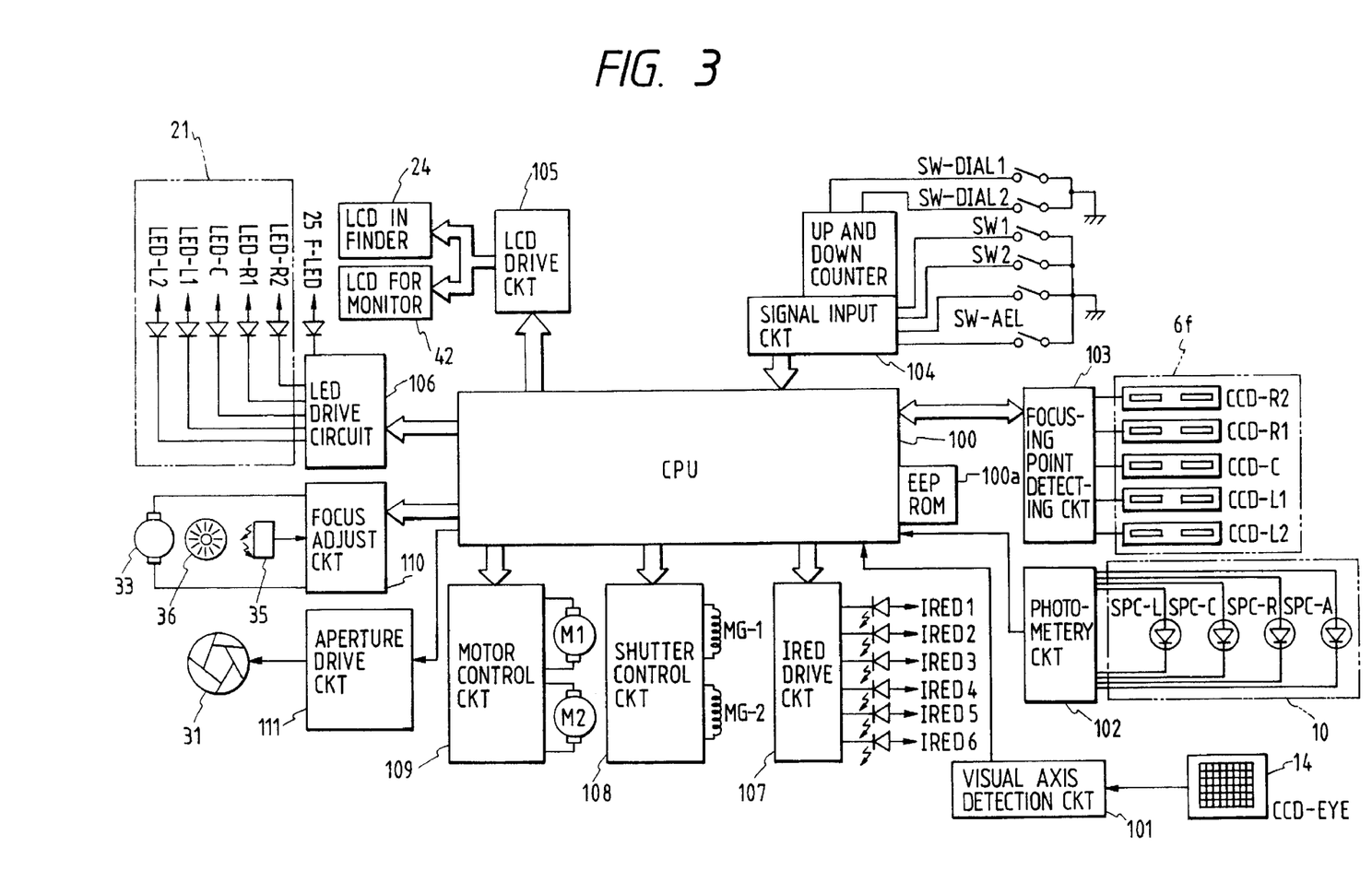
FIG. 3 is a block diagram showing the electrical construction of the camera of FIG. 1.

FIG. 3 is a block diagram showing the electrical construction contained in the single-lens reflex camera of the above-described construction, and in FIG. 3, the same portions as those in FIGS. 1 and 2 are given the same reference numerals.

A central processing unit (hereinafter referred to as the CPU) 100 which is a microcomputer contained in the camera body has connected thereto a visual axis detection circuit 101, a photometry circuit 102, an auto focus detection circuit 103, a signal input circuit 104, an LCD drive circuit 105, an LED drive circuit 106, an IRED drive circuit 107, a shutter control circuit 108 and a motor control circuit 109. Also, transmission of a signal is effected with a focus adjust circuit 110 and an aperture drive circuit 111 disposed on the photo-taking lens 1 side through the mount contact 37 shown in FIG. 1.

EEPROM 100a annexed to the CPU 100 has a function of memorizing visual axis correction data for correcting personal difference in visual axis as memory means.

The visual axis detection circuit 101 A/D-converts the signal of the eyeball image from an image sensor 14 (CCD-EYE) and transmits this A/D-converted image information to the CPU 100. The CPU 100, as will be described later, extracts each characteristic point of the eyeball image necessary for visual axis detection in accordance with a predetermined algorithm, and further calculates the photographer's visual axis from the position of each characteristic point.

The photometry circuit 102 amplifies the signal from the photometry sensor 10, and thereafter logarithmically compresses it and A/D-converts it, and transmits it as the luminance information of each sensor to the CPU 100. The photometry sensor 100 is comprised of a photodiode for photometering four areas shown in FIG. 2, i.e., SPC-L for photometering a left area 210 including left side focus detection areas 200 and 201 in the field of view of the finder, CSPC-C for photometering the central area 211 including a focus detection area 202, SPC-R for photometering a right area 212 including right side focus detection areas 203 and 204, and SPC-A for photometering the circumferential area 213 of these.

A line sensor 6f is a conventional CCD line sensor comprised of five sets of line sensors CCD-L2, CCD-L1, CCD-C, CCD-R1 and CCD-R2 corresponding to the five focus detection areas 200–204 in the screen shown in FIG. 2.

The auto focus detection circuit 103 A/D-converts a voltage obtained from the line sensor 6f and sends the A/D-converted voltage to the CPU 100.

SW1 designates a switch adapted to be closed by the first stroke of a release button and starts photometry, AF, the visual axis detecting operation, etc., SW2 denotes a release switch adapted to be closed by the second stroke of the release button, SW-AEL designates an AE switch adapted to be closed by an AE lock button, not shown, being depressed, and SW-DIAL1 and SW-DIAL2 denote dial switches provided in an electric dial, not shown, and the signals thereof are input to the up and down counter of the signal input circuit 104, where an amount of rotational click of the electronic dial is counted.

The LCD drive circuit 105 comprises a conventional construction for display-driving the LCD which is a liquid crystal display element, and can cause an aperture value, a shutter speed, a set photographing mode, etc. to be displayed at a time on both a monitoring LCD 42 and the LCD 24 in finder, in accordance with a signal from the CPU 100.

The LED drive circuit 106 controls turning on and off the illuminating LED (F-LED) 25 and the LEDs 21 for superimposition. The IRED drive circuit 107 selectively turns on infrared light emitting diode (IRED1-6) 13a–13f in conformity with the situation.

The shutter control circuit 108 controls a magnet MG-1 which, when electrically energized, moves a forward shutter curtain and a magnet MG-2 which, when electrically energized, moves a rearward shutter curtain, and exposes a photosensitive member with a predetermined quantity of light. The motor control circuit 109 is for controlling a motor M1 which effects winding and rewinding a film, the main mirror 2 and a motor M2 which effects charging the shutter 4.

Figure 4:
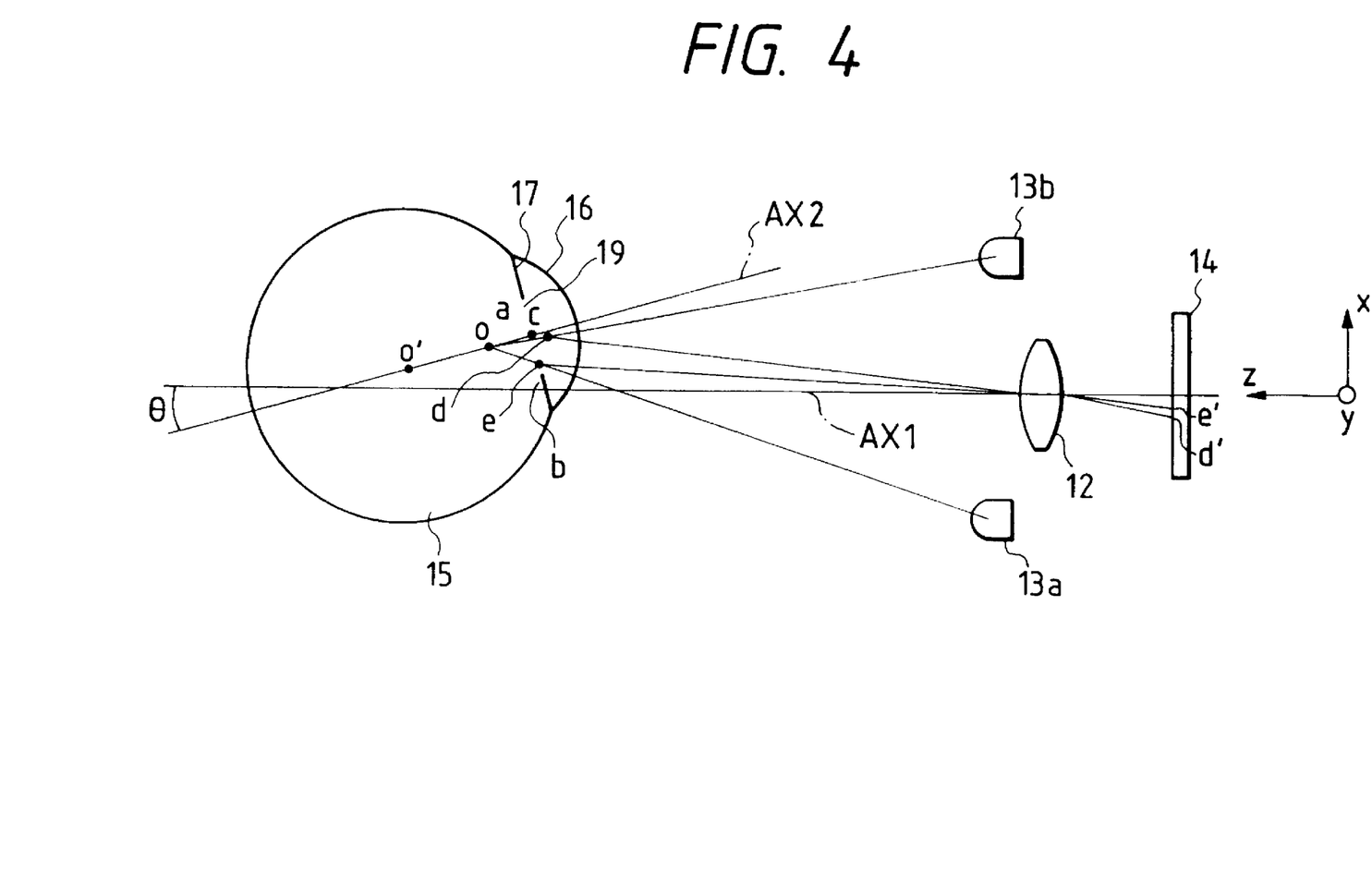
FIG. 4 is a view for illustrating the principle of visual axis detection in a camera of this kind.
Figure 5A:
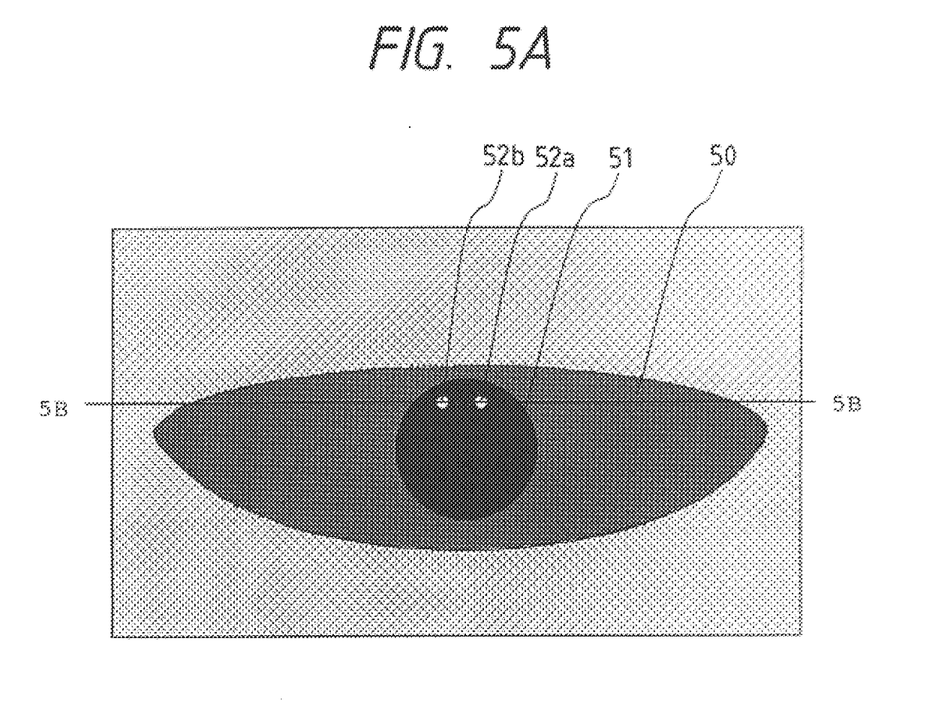
FIGS. 5A and 5B show an eyeball image projected onto the image sensor of FIG. 4 and an example of the image signal output thereof.
Figure 5B:
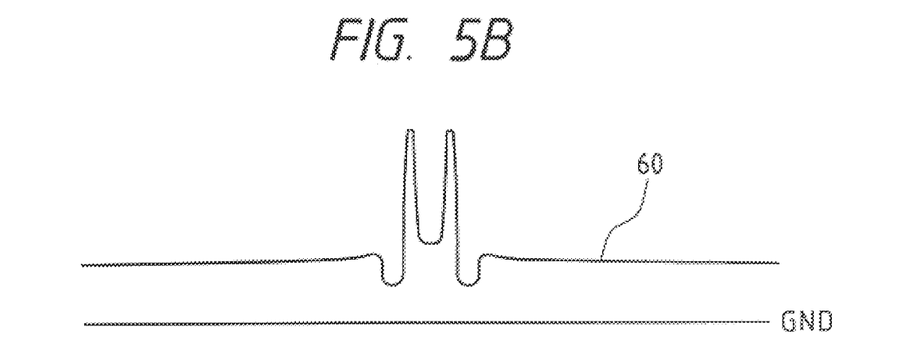

FIG. 4 is a view for illustrating a principle of visual axis detection. FIG. 5A shows an eyeball image projected onto the surface of the image sensor 14 of FIG. 4, and FIG. 5B shows an image signal output 60 on the line 5B—5B of FIG. 5A.

In FIG. 5A, the reference numeral 50 designates so-called the white of the eyeball, the reference numeral 51 denotes the pupil, and the reference characters 52a and 52b designate the cornea-reflected images of the eyeball illuminating light source.

A visual axis detecting method will now be described with reference to FIGS. 4, 5A and 5B.

The infrared light emitting diodes 13a and 13b are disposed substantially symmetrically in x-direction with respect to the optical axis AX1 of the light receiving lens 12 and divergently illuminate the observer's (photogapher's) eyeball.

The infrared light emitted from the infrared light emitting diode 13b illuminates the cornea 16 of the eyeball 15. At this time, the cornea-reflected image d by part of the infrared light reflected by the surface of the cornea 16 is condensed by the light receiving lens 12 and is re-imaged at a position d' on the image sensor 14.

Likewise, the infrared light emitted from the infrared light emitting diode 13a illuminates the cornea 16 of the eyeball 15. At this time, the cornea-reflected image by part of the infrared light reflected by the surface of the cornea 16 is condensed by the light receiving lens 12 and is re-imaged at a position e' on the image sensor 14.

Also, the beams of light from the end portions a and b of the iris 17 forms the images of these end portions a and b at positions a' and b', not shown, on the image sensor 14 through the light receiving lens 12. When the angle of rotation θ of the optical axis AX2 of the eyeball 15 relative to the optical axis AX1 of the light receiving lens 12 is small, assuming that the x coordinates of the end portions a and b of the iris 17 are xa and xb, the coordinates xc of the central position c of the pupil 19 are expressed as $$xc \approx (xa+xb)/2.$$

Also, the x coordinates of the midpoint between the cornea-reflected images d and e and the x coordinates xo of the center of curvature 0 of the cornea 16 coincide with each other and therefore, assuming that the x coordinates of the positions at which the cornea-reflected images d and e are produced are xd and xe, that the standard distance from the center of curvature 0 of the cornea 16 to the center c of the pupil 19 is $L_{oc}$ and that a coefficient taking the individual difference relative to this distance $L_{oc}$ into account is A1, the angle of rotation θ of the optical axis AX2 of the eyeball 15 substantially satisfies following relational expression:

$$(A1*L_{oc})*\sin\theta \approx xc-(xd+xe)/2 \qquad (1)$$

Therefore, the angle of rotation θ of the optical axis AX2 of the eyeball 15 can be found by detecting the positions of the respective characteristic points (the cornea-reflected images d, e and the end portions a, b of the iris 17) projected onto portions on the image sensor 14 in the visual axis detection circuit 101. At this time, the above expression (1) is rewritten as follows:

$$\beta(A1*L_{oc})*\sin\theta \approx (xa'+xb')/2-(xd'+xe')/2, \qquad (2)$$

where β is the magnification determined by the position of the eyeball 15 relative to the light receiving lens 12, and is substantially found as a function of the spacing |xd'-xe'| between the cornea-reflected image of the infrared light emitting diodes 13a and 13b. The angle of rotation θ of the optical axis AX2 of the eyeball 15 is rewritten as follows:

$$\theta \approx ARCSIN\{(xc'-xf')/\beta/(A1*L_{oc})\}, \qquad (3)$$

where $$xc' \approx (xa'+xb')/2$$

$$xf' \approx (xd'+xe')/2$$

Now, in many cases, the visual axis and optical axis AX2 of the photographer's eyeball 15 do not coincide with each other and therefore, when the angle of rotation θ of the optical axis AX2 in a horizontal direction is calculated, the angle correction δ of the optical axis AX2 and the visual axis is done, whereby the photographer's visual axis θH in the horizontal direction is found. When a coefficient taking the individual difference relative to the corrected angle δ of the optical axis AX2 and visual axis of the eyeball 15 into account is B1, the photographer's visual axis θH in the horizontal direction is found as:

$$\theta H=\theta \pm (B1*\delta). \qquad (4)$$

As regards the signs ±, assuming that the angle of rightward rotation with respect to the photographer is positive, when the photographer's eye looking into the observation apparatus is his or her left eye, the sign + is selected, and when the photographer's eye looking into the observation apparatus is his right eye, the sign — is selected.

Also, in FIG. 4, there is shown an example in which the photographer's eyeball rotates in Z-X plane (for example, a horizontal plane), but detection is likewise possible when the photographer's eyeball rotates in z-y plane (for example, a vertical plane). However, the component of the photographer's visual axis in the vertical direction coincides with the component θ' of the optical axis AX2 of the eyeball 15 in the vertical direction and therefore, the visual axis θv in the vertical direction is:

$$\theta V=\theta'.$$

Further, from the visual axis data θH and θV, the positions (xn, yn) on the focusing screen in the field of view of the finder the photographer is looking at are found as:

$$xn \approx m*\theta H$$
$$\approx m*[ARCSIN\{(xc'-xf')/\beta/(A1*L_{oc})\} \pm (B*\alpha)] \qquad (5)$$
$$yn \approx m*\theta V,$$

where m is a constant determined by the construction of the optical system of the finder of the camera.

Here, the values of the coefficients A1 and B1 correcting the individual difference in the photographer's eyeball 15 are found by having the photographer fixate at a visual mark disposed at a predetermined position in the finder of the camera, and making the position of the visual mark and the position of the fixating point calculated in accordance with the above expression (5) coincident with each other.

Usually, the calculation for finding the photographer's visual axis and fixating point is executed in a software-like fashion in the CPU 100 on the basis of the above-mentioned expressions.

The coefficient for correcting the individual difference in the visual axis is found, the position of the visual axis of the photographer looking into the finder of the camera on the focusing screen (the position of the gazing point) is calculated by the use of the above expression (5), and the result of the calculation (visual axis information) is utilized for the focus adjustment of the photo-taking lens or exposure control or the like.

Figure 6:
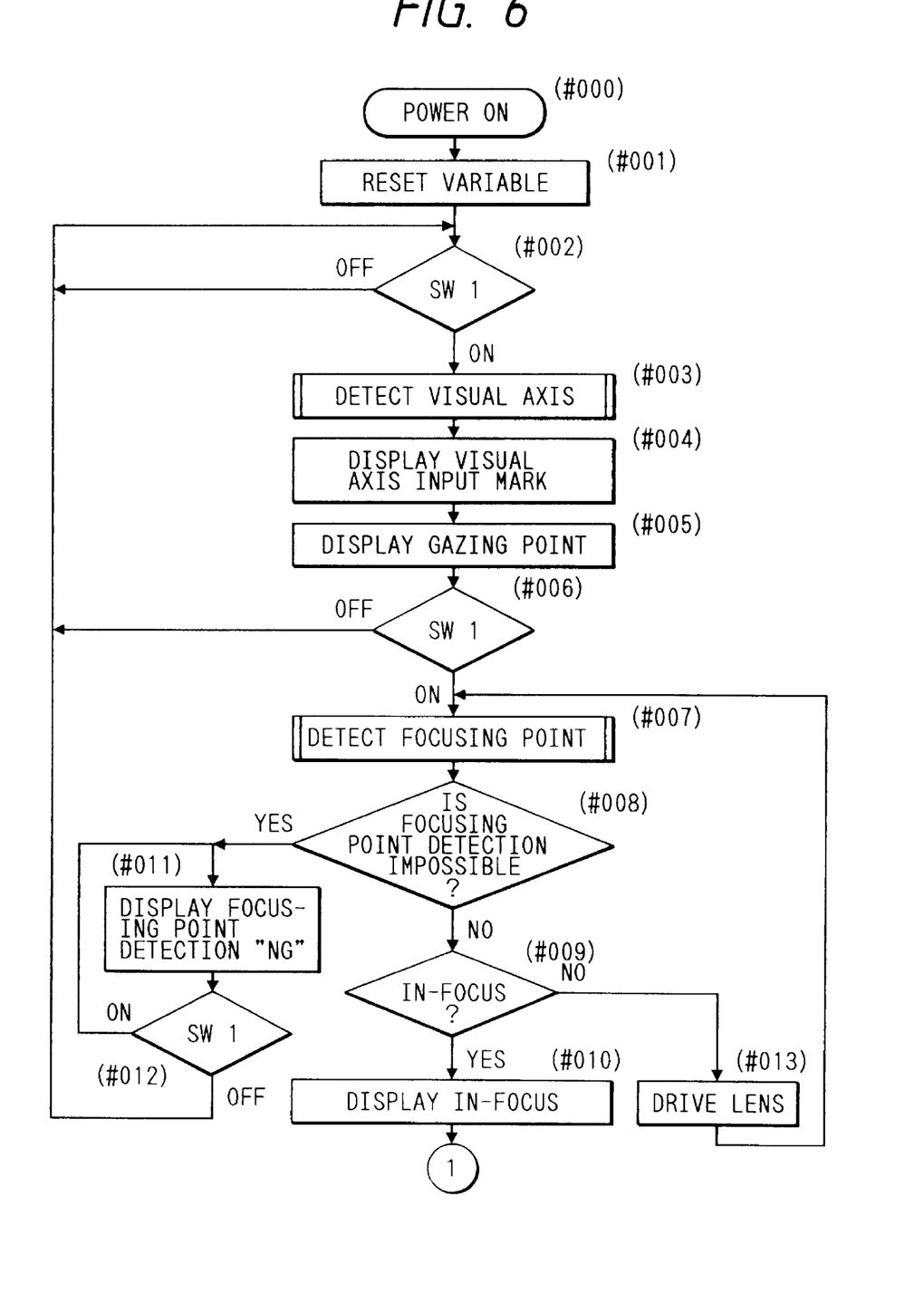
FIG. 6 is a flow chart schematically showing the operation in the first embodiment of the present invention.
Figure 7:
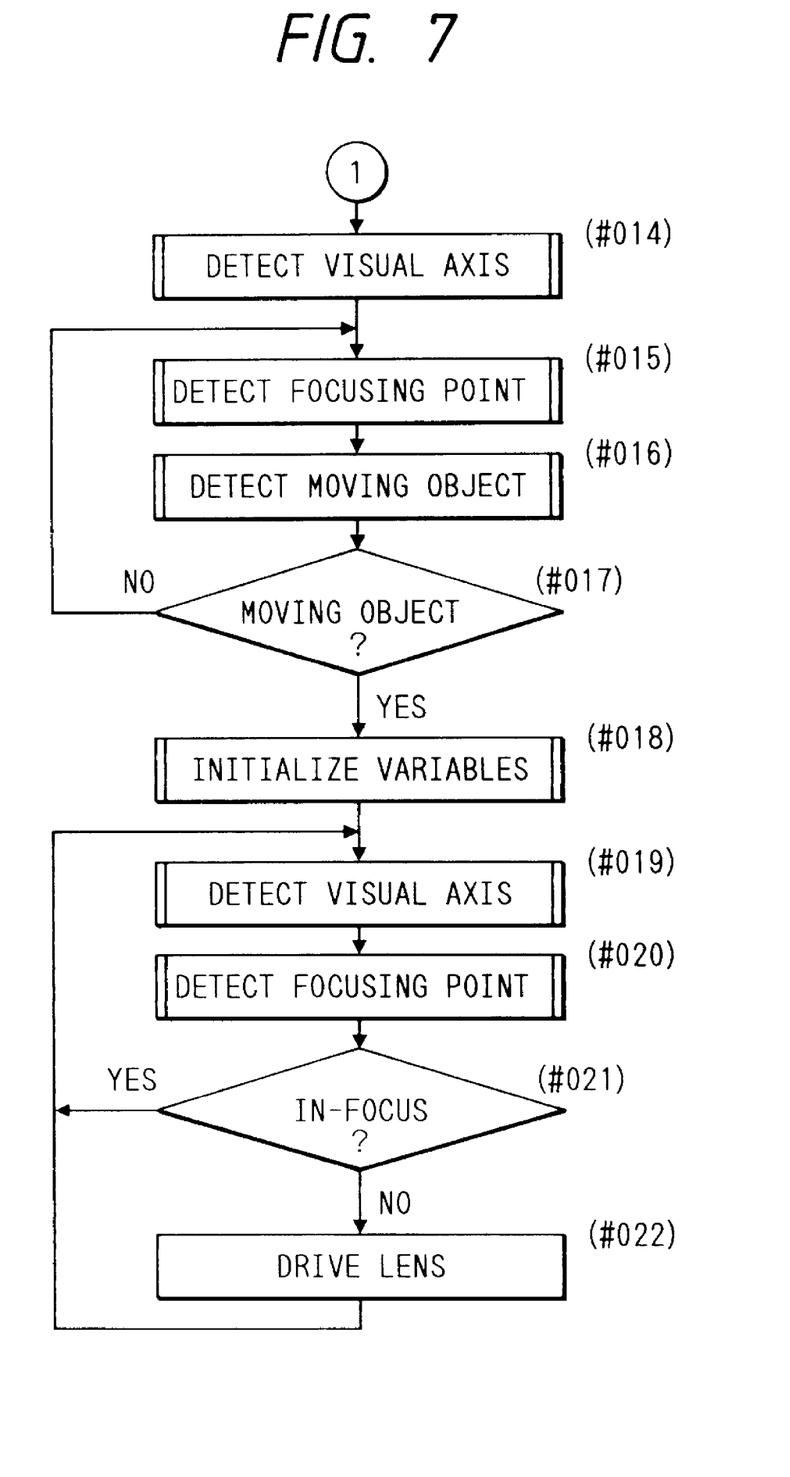
FIG. 7 is a flow chart showing the continuous operation of FIG. 6.
Figure 8:
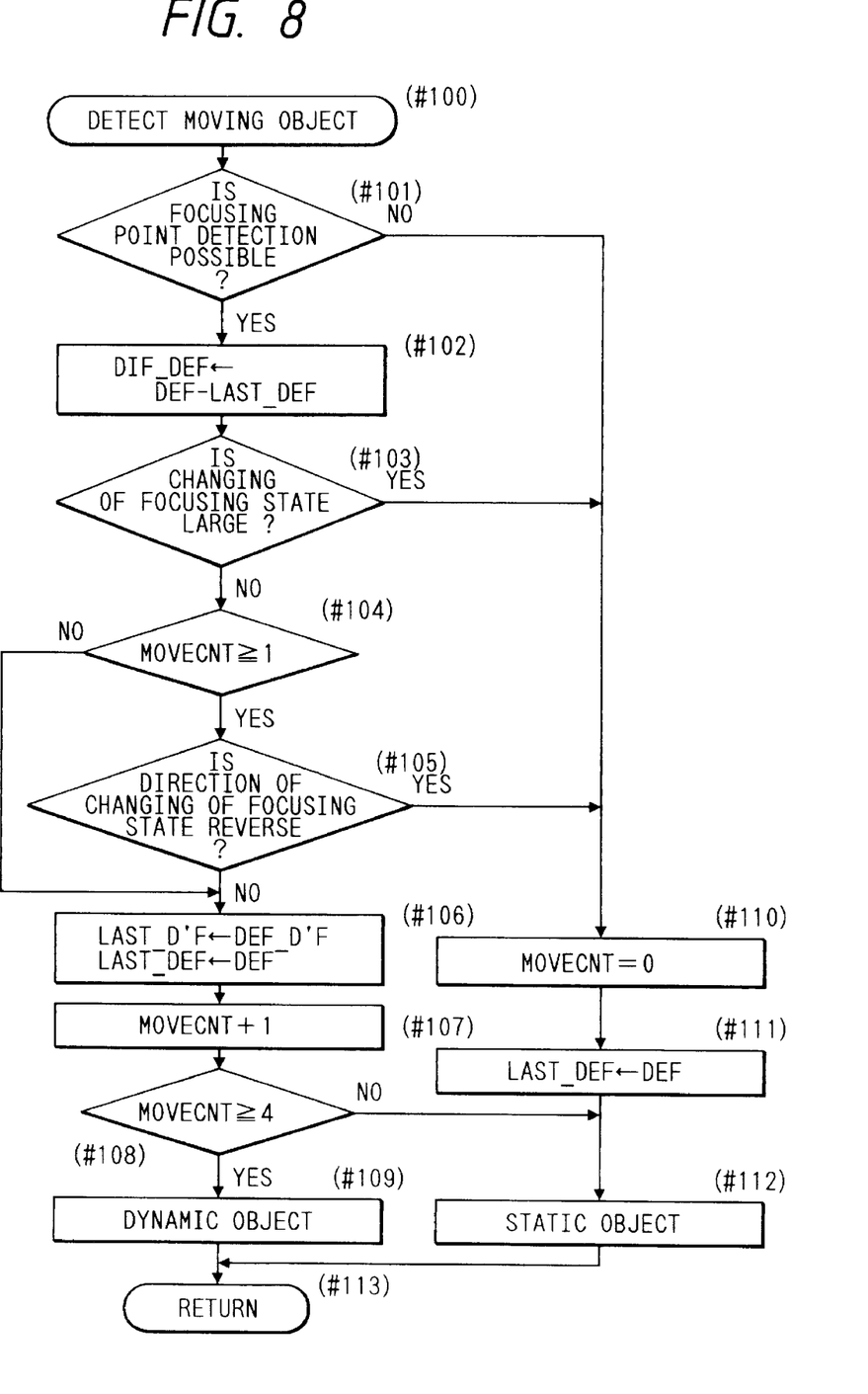
FIG. 8 is a flow chart showing the dynamic object detecting operation at the step (#015) of FIG. 7.

The operation of the single-lens reflex camera having the visual axis detecting means and the focus detecting means will now be described with reference to the flow charts of FIGS. 6 to 8.

When a mode dial, not shown, is rotated to set the camera from its inoperative state to a predetermined photographing mode (in this embodiment, description will be made on the basis of a case where the camera is set to the full-auto mode), the power source of the camera becomes ON (step 000), and a variable in the CPU 100 used for focus detection and visual axis detection is reset (step 001).

Subsequently, the release button is depressed and the camera waits until the switch SW1 becomes ON (step 002). When the release button is depressed and it is detected through the signal input circuit 104 that the switch SW1 has become ON, the CPU 100 executes the visual axis detecting operation (step 003). The illuminating LED (F-LED) 25 is then turned on through the LED drive circuit 106, and the visual axis input mark 78 of the LCD 24 in finder is turned on through the LCD drive circuit 105 (step 004). Thereby, in the exterior 207 of the finder screen, the photographer can confirm that the camera is effecting visual axis detection.

Subsequently, a signal is transmitted to the LED drive circuit 106 to inform the photographer of a focus detection area selected by the visual axis detected in the visual axis detection circuit 101, and that focus detection area is flickered for display by the use of the LED 21 for superimposition (step 005). When the photographer then sees the focus detection area selected by the visual axis input having been displayed and recognizes that the focus detection area is not correct, and releases the release button and the switch SW1 becomes OFF (step 006), the camera waits until the switch SW1 becomes ON (step 002).

Design is thus made such that the focus detection area in the field of view of the finder is turned on and off to inform the photographer that the focus detection area has been selected by the visual axis information and therefore, the photographer can confirm whether the focus detection area has been selected as per his or her will.

Also, if the photographer sees the flickering display of the focus detection area selected by the visual axis and continues to depress the switch SW1 (step 006), the focusing point detection of one or more selected focus detection areas is executed through the auto focus detection circuit 103 (step 007). Then, whether the selected focus detection areas are incapable of effecting focusing point detection is judged (step 008), and if they are incapable, the CPU 100 sends a signal to the LCD drive circuit 105 to thereby flickering the in-focus mark 79 (see FIG. 2) of the LCD 24 in finder, and warns the photographer that focusing point detection is NG (impossible) (step 011), and continues this operation until the switch SW1 becomes OFF (step 012).

Also, if focusing point detection is possible and the focus adjusted state of the focus detection area selected by a predetermined algorithm is not in-focus (step 009), the CPU 100 sends a signal to the lens focus adjust circuit 110 to drive the photo-taking lens 1 by an amount (step 013). After driving the lens, focusing point detection is again effected by the auto focus detection circuit 103 (step 007), and whether the photo-taking lens 1 is in focus is judged (step 009).

If the photo-taking lens is in focus in a desired focus detection area (step 009), the CPU 100 sends a signal to the LCD drive circuit 105 to thereby light the in-focus mark 79 of the LCD 24 in finder, and also sends a signal to the LED drive circuit 106 to thereby cause the focus detection area which is in focus to display the in-focus (step 010).

At this time, the flickering display of the focus detection area selected by the visual axis is turned off, but since it is often the case that the in-focus displayed focus detection area and the focus detection area selected by the visual axis coincide with each other, the in-focus focus detection area is set to its lighting state in order to make the photographer recognize that the focus detection area is in focus.

Once the in-focus state is reached, shift is made to the operation of detecting and discriminating whether the object is a moving object.

First, visual axis detection is executed only once to set for which focus detection area the operation of detecting the focus state for the discrimination of a moving object should be performed (step 014). Then, in order to detect the focus state necessary to discriminate whether the object is a moving object, the focusing point detection of the selected focus detection area corresponding to the visual axis information detected at the step 014 through the auto focus detection circuit 103 is executed (step 015). Then, whether the object is a moving object is detected on the basis of the focusing point information obtained at the step 015 (step 016).

If as a result of the detection of whether the object is a moving object, it is discriminated that the object is not a moving object (step 017), focusing point detection is repetitively executed to obtain information necessary to detect again whether the object is a moving object (step 015).

If it is discriminated that the object is a moving object (step 017), the initialization of the flag variable related to the focusing point detection calculation necessary when the focusing point detecting operation shifts from a mode for a static object to a mode for a dynamic object is then effected (step 018).

From here, the operation becomes the mode for a dynamic object.

Subsequently, the CPU 100 executes the focusing point detecting operation (step 019). In the present embodiment, in the mode for a dynamic object, the focusing point detecting operation is executed once for one focusing point detection operation.

The focusing point detecting operation of one or more selected focus detection areas is then executed through the auto focus detection circuit 103 (step 020). Subsequently, whether the focusing point detection state of the selected focus detection areas is in-focus is examined (step 021), and if it is in-focus, the visual axis detecting operation is executed to continue to repetitively detect the focusing point state of the focus detection area intended by the photographer (step 019).

Also, if the focusing point detection state of the focus detection area selected by the visual axis detecting operation is not in-focus (step 021), the CPU 100 sends a signal to the lens focus adjust circuit 110 to thereby drive the photo-taking lens 1 by a predetermined amount (step 022), and executes the visual axis detecting operation to continue to repetitively detect the focusing point state of the focus detection area intended by the photographer (step 019).

The operation of "detecting a moving object" executed at the step 016 will now be described with reference to the flow chart of FIG. 8.

First, whether the focus detection area obtained at the step 014 is incapable of effecting focusing point detection is discriminated (step 101), and if the focus detection area obtained at the step 014 is incapable of effecting focusing point detection, shift is made to a step 110 which will be described later.

Also, if the focus detection area obtained at the step 014 is capable of effecting focusing point detection, an amount of change of focusing state DIF__FEF is found on the basis of the focusing point detection for the last moving object detection, i.e., the defocus amount LAST__DEF obtained at the last step 015, and the focusing point detection for the current moving object detection, i.e., the defocus amount DEF obtained at the current step 015 (step 102). Specifically, the amount of change of focusing state DIF_DEF is found from the difference between the current defocus amount DEF and the last defocus amount LAST_DEF.

Subsequently, whether the amount of change of focusing state DIF_DEF is greater than a predetermined value is discriminated (step 103), and if it is greater than the predetermined value, it is judged that the object has suddenly come off the focus detection area, and shift is made to a step 110.

If the amount of change of focusing state DIF_DEF is smaller than the predetermined value (step 103), whether a variable MOVECNT which counts how many times a condition for presuming the object to be a moving object has occurred on end is equal to or greater than "1" is then discriminated (step 104). If the variable MOVECNT is equal to or greater than "1", whether the direction of the current amount of change of focusing state DIF_DEF and the direction of the last amount of change of focusing state LAST_DIF are opposite of each other or the same is then discriminated (step 105). If as a result, the directions of the amount of change of focusing state are reversed, shift is made to the step 110.

Also, if it is discriminated that the variable MOVECNT is MOVECNT is less than "1" (step 104), the operation of the step 105 is skipped and shift is made to a step 106. This is for preventing wrong judgment from being done when the operation of the step 105 is executed, because a wrong value may come into the current amount of change of focusing state DIF_DEF when the variable MOVECNT is MOVECNT is less than "1".

Then, the current amount of change of focusing state DIF_DEF is stored into LAST_DIF and the current defocus amount DEF is stored into LAST_DEF, and data necessary for the next moving object detection is memorized (step 106). Subsequently, "1" is added to the variable MOVECNT which counts how many times the condition for presuming the object to be a moving object has occurred on end (step 107). Then, whether the variable MOVECNT is equal to or greater than "4" is discriminated (step 108). This is done to recognize the object to be a moving object only when the condition for presuming the object to be a moving object has occurred four times on end.

If the variable MOVECNT is equal to or greater than "4" (step 108), it is memorized that the object is a "moving object" (step 109), and the moving object detecting operation is terminated (step 113). If the variable MOVECNT is less than "4" (step 108), it is judged that or recognized that the object is not a moving object and a to be a moving object, and shift is made to a step 112.

When at the step 101, it is discriminated that focusing point detection is impossible, when at the step 103, it is discriminated that the amount of change of focusing state DIF_FED is greater than the predetermined value, and when at the step 105, it is discriminated that the direction of the amount of change of focusing state differs between the last time end this time, shift is made to the step 110 as previously described.

At the step 110, the variable MOVECNT which counts how many times the condition for presuming the object to be a moving object has occurred on end is cleared. This is because the condition for presuming the object to be a moving object is not satisfied. Subsequently, the current defocus amount DEF is stored into LAST_DEF, and data necessary for the next moving object detection is memorized (step 111). It is then memorized that the object is a "static object" (the object cannot yet be judged to be a moving object) (step 112), and the moving object detecting operation is terminated (step 113).

In the embodiment hitherto described, design is made such that after focusing has been done in the mode for a static object, visual axis detection for selecting a focus detection area which effects moving object detection is executed only once, whereupon the focusing point detecting operation and moving object detection are repetitively executed with respect to the selected focus detection area, but it is also possible that a focus detection area obtained by the visual axis detecting operation for the focusing operation executed in the mode for a static object is intactly regarded as a focus detection area for moving object detection and after focusing has been done in the mode for a static object, focusing point detection and moving object detection are repetitively executed.

Figure 9:
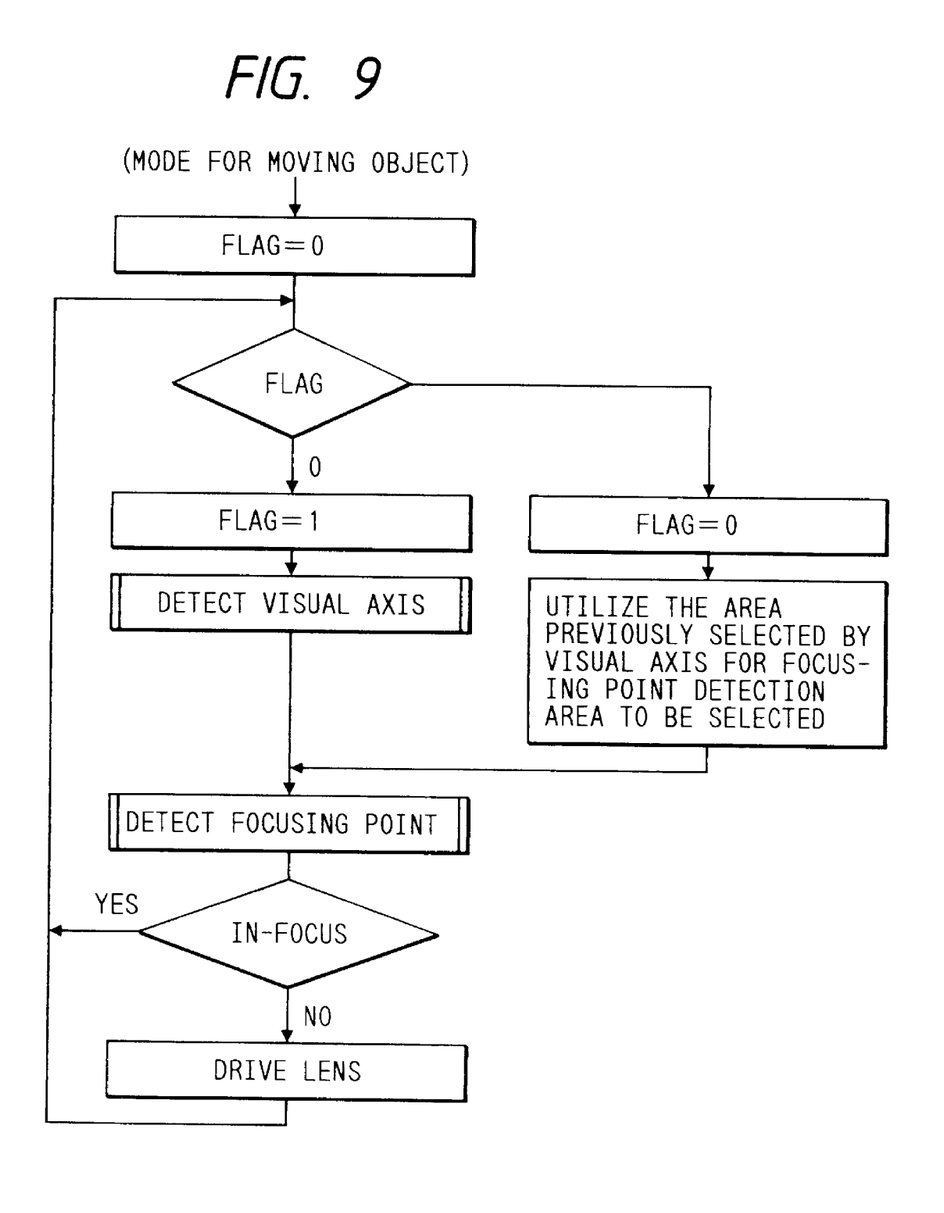
FIG. 9 is a flow chart showing another example of a mode suitable for a dynamic object.

Also, in this embodiment, design is made such that after the shift to the mode for a dynamic object, the visual axis detecting operation is first executed, whereafter the focusing point detecting operation is executed and that operation is repetitively executed, but it is also effective to design such that as shown in FIG. 9, the visual axis detecting operation is repetitively executed at a rate of once relative to the focusing point detecting operation being executed twice.

According to the present embodiment, in an apparatus wherein the mode for a static object and the mode for a dynamic object can be switched in the same focus adjusting mode, design is made such that the one mode and the other mode are switched by the focusing point state of a focus detection area selected by the visual axis detection state and therefore, it becomes possible to switch each mode by the focusing point state of the focus detection area intended by the photographer, and the camera can be prevented from shifting to the mode for a dynamic object when the photographer does not intend it.

What is claimed is:

1. An optical apparatus comprising:

a visual axis detecting circuit that detects a visual axis of a user;

a focus detecting circuit, including a plurality of focus detecting areas, that performs a plurality of different focus detection operations;

a discriminating circuit that discriminates whether an object positioned at a focus detecting area is a moving object or a static object on the basis of a result of a first focus detection operation by said focus detecting circuit in a focus detecting area in accordance with a visual axis detected by said visual axis detecting circuit; and a control circuit that repeats a visual axis detection operation of said visual axis detecting circuit when said discrimination circuit judges that an object is moving, performs a second focus detection operation, different from the first focus detection operation, in a focus detecting area corresponding to the detected visual axis, and drives an optical system in accordance with the result of the second focus detection operation.

2. An optical apparatus according to claim 1, wherein said discriminating circuit repeats a discrimination operation for a same focus detecting area when said discriminating circuit judges that an object is not moving.

3. An optical apparatus according to claim 1, wherein said discriminating circuit judges that an object is moving when a result of a focus detection operation at a focus detecting area is continuously changing in the same direction.

4. An optical apparatus according to claim 1, wherein said first focus detection operation of said focus detecting circuit is suitable for a static object and said second focus detecting operation of said focus detecting circuit is suitable for a moving object.

5. An optical apparatus according to claim 1, wherein said visual axis detecting circuit inhibits new visual axis detecting operation until said discriminating circuit judges that the object is moving.

* * * * *

UNITED STATES PATENT AND TRADEMARK OFFICE
CERTIFICATE OF CORRECTION

PATENT NO. : 5,835,797

DATED : November 10, 1998

INVENTOR(S): YUKIO ODAKA

Page 1 of 2

It is certified that error appears in the above-identified patent and that said Letters Patent is hereby corrected as shown below:

TITLE PAGE, ITEM [56]

Foreign Priority Documents, "02042430" should read --2-042430--.

FIGURE 3,

"PHOTO-METERY" should read --PHOTO-METRY--.

COLUMN 1,

Line 50, "in" should read --in the--.

COLUMN 7,

Line 9, "(photogapher's)" should read --(photographer's)--.

COLUMN 11,

Line 22, "MOVECNT is" should be deleted;
Line 28, "MOVECNT is" should be deleted;
Line 46, "to be a moving object," should be deleted;
Line 47, "and" should be deleted; and

UNITED STATES PATENT AND TRADEMARK OFFICE
CERTIFICATE OF CORRECTION

PATENT NO. : 5,835,797

DATED : November 10, 1998

INVENTOR(S) : YUKIO ODAKA

It is certified that error appears in the above-identified patent and that said Letters Patent is hereby corrected as shown below:

COLUMN 11

Line 53, "end" should read --and--.

Signed and Sealed this

Twenty-eighth Day of September, 1999

Attest:

Q. TODD DICKINSON

*Attesting Officer*   *Acting Commissioner of Patents and Trademarks*